Dec. 3, 1929. R. E. FLANDERS ET AL 1,737,579
TAP HOLDER FOR COMPARATORS
Filed Feb. 14, 1928
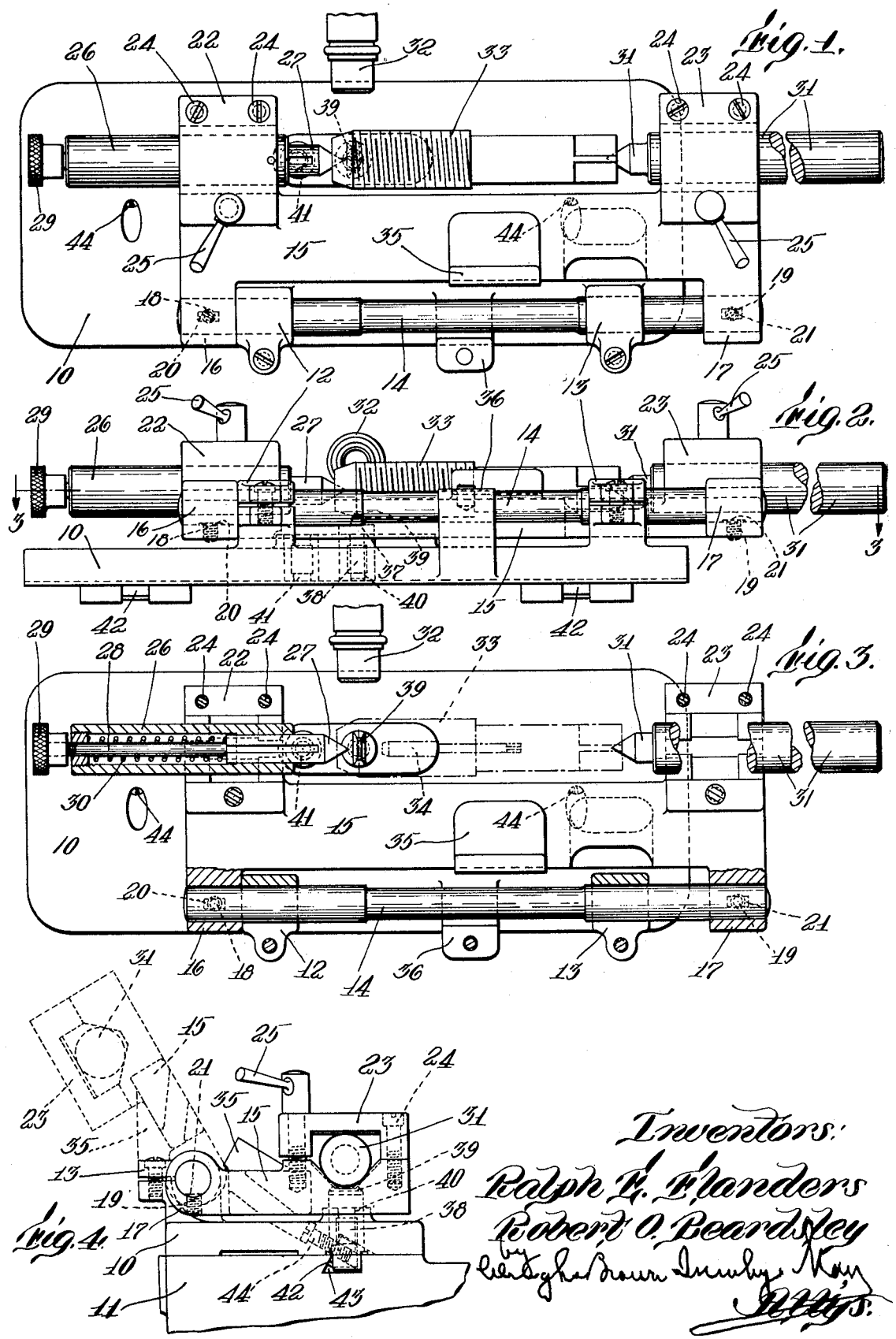

Patented Dec. 3, 1929

1,737,579

UNITED STATES PATENT OFFICE

RALPH E. FLANDERS AND ROBERT O. BEARDSLEY, OF SPRINGFIELD, VERMONT, ASSIGNORS TO JONES & LAMSON MACHINE COMPANY, OF SPRINGFIELD, VERMONT, A CORPORATION OF VERMONT

TAP HOLDER FOR COMPARATORS

Application filed February 14, 1928. Serial No. 254,191.

This invention relates to a device for holding taps or other screw threaded bodies in correct position in a comparator for inspection of the thread thereof. An object of the invention is to provide means for quickly and accurately positioning a tap so that its thread may be compared with a true or standard thread. Such a comparison may be had by the use of a comparator, such as is described in the patent to Hartness No. 1,377,068, May 3, 1921, or in the application of Hartness et al., Serial No. 31,746, filed May 21, 1925. A comparator comprises means for projecting a beam of light across a small portion of the outline edge of a screw or tap, the shadow image of the outline being magnified and projected on a suitable screen where it may be compared with the image of a master screw thread as indicated by suitable marks on the screen. In order to make a true comparison between the master gage and the several taps or screws which are compared to it, it is essential that the gage and taps or screws be held in an identical position in the comparator when the images on the screen are inspected since an error in the positioning of the screw or tap on its support would show upon the screen as an error of the screw itself. In addition to accuracy of location of the tap or screw, it is highly desirable for economic reasons to have a holder or mounting fixture which will receive the tap or screw with a minimum expenditure of time and care on the part of the operator. It will be apparent that these and other desirable advantages are afforded by the improved holder which is hereinafter described and is illustrated on the drawing, of which,—

Figure 1 is a plan view of apparatus embodying our invention.

Figure 2 is a front elevation of the apparatus.

Figure 3 is a section on the line 3—3 of Figure 2.

Figure 4 is an end elevation, showing the hinged arm in two positions of operation.

Referring to the drawing in detail, 10 represents a base member which may be provided with means for adjustably securing it to the bed 11 of a comparator, a portion of which is indicated in Figure 4. This base is provided with a pair of bearings 12, 13 in which is journaled a suitable shaft 14. Fixed to the shaft 14 is an arm 15 having a pair of forwardly extending ears 16, 17 which are bored to receive the ends of the shaft 14. The shaft is fixed in the ears 16 and 17 as by suitable set screws 18, 19 which engage against flats 20, 21 formed on the side of the shaft. As shown on the drawing, the bearings 12 and 13 engage the shaft 14 at points intermediate of the ears 16, 17. The arm 15 is also provided with a pair of rearwardly extending clamp members comprising suitable yokes 22, 23 which may be held in place as by screws 24, certain of these screws being provided with suitable handles 25 to facilitate releasing and setting up the clamps. The clamps 22 and 23 hold centering means which are designed to engage the work at its ends and to center it in a predetermined position with respect to the arm. The centering member supported by the clamp 22 may comprise as shown a quill 26 which is gripped by the clamp and which contains a slidable spring-pressed member 27, a portion of which projects therefrom to engage the work. The member 27 is provided with a stem 28 extending through the quill 26 and having a finger piece 29 on the opposite end thereof by which the work-engaging end may be withdrawn from the work against the pressure of the spring 30. The clamp 23 supports a centering member 31 which has a portion projecting therefrom to engage the end of the work opposite to the end engaged by the member 27. The quill 26 and the member 31 may be adjustably held by their respective clamps in any desired position to engage a tap and to support it with its first cutting thread in line with the beam of light which is arranged to be projected across the upper surface of the work and to enter the optical tube 32 by which the image of the portion of the outline of the work which is encountered by the beam of light may be magnified for projection on a screen (not shown). In Figure 3, two taps of different sizes are indicated as 33 and 34 respectively, to indicate different sizes of work which can be accommodated by the device. In the other figures of the drawing, the larger 33 is indicated in place in the apparatus for inspection. In order to facilitate the insertion of work between the centering members 27, 31, the arm 15 may be swung upwardly and forwardly as shown in Figure 4 until a suitable lug 35 on the arm rests against a corresponding abutment 36 on the base member 10. Retraction of the centering member 27 by pulling on the finger piece 29 will permit the replacement of one tap by another. When the work has been inserted between the centering members 27 and 31, the arm 15 may then be swung rearwardly and downwardly on its hinge until the lower surface of the work engages and is stopped by a suitable anvil 37. This anvil is provided with a cylindrical stem 38 which fits closely into a suitable bore 40 in the base 10 and is permitted to turn freely therein so as to adjust itself to the helix angle of the thread which rests upon it. The upper end of the anvil 37 is preferably tapered as at 39 to enter between successive turns of the thread of the tap. When a tap is swung down to engage the anvil 37 as shown in Figure 2, the tap is turned on its axis by hand to fit the threads snugly over the end 39 and to bring one of the threaded portions or lands of the periphery of the tap uppermost so as to present the profile of one of its threads to the path of the light beam. A second bore 41 is provided in the base member 10, the bore 41 being spaced preferably about an inch from the bore 40. When the arm 15 is swung upwardly carrying the work clear of the anvil 37, the latter may be readily removed from or inserted into either of the bores 40, 41.

In many cases it is desired to inspect taps for diameter errors and shape of thread, ignoring a possible error in pitch lead. In such cases, the anvil is inserted in the bore 40. Then a master gage is inserted between the centering members 27, 31 and is swung down with the arm 15 until its lower surface engages the end 39 of the anvil 37. When the master gage has been adjusted so that the end 39 is received snugly between the threads of the gage which correspond to the first and second cutting threads of a tap, the apparatus is adjusted so that outline images of the gage are thrown on the screen in line with prominent marks on a screen to indicate tolerances. The gage is then removed and may be replaced by work which is to be compared thereto. Each tap to be examined is placed between the centering members 27, 31 and swung downwardly with the arm 15 until its lower edge engages the anvil 37. When its cutting threads receive the end 39 snugly between them, the outline image of the threads is compared with the marks on the sheet to see if they fall within the limits of the tolerances indicated thereon. The table is swung upwardly after each inspection to facilitate the replacement of the inspected tap by one to be inspected.

When it is desired to inspect taps for errors in pitch lead as well as in diameter and shape, the reference point of support, in this apparatus the anvil 37, should be axially spaced from the beam of light. Thus if there is an error in the pitch lead of a tap, the axial distance between the thread supported by the anvil and the thread interposed in the light beam will not equal the corresponding distance on the master gage. Hence this error will appear on the chart as a lateral displacement of the image of the thread. To this end, the anvil 37 may be removed from the bore 40 and inserted in the bore 41. The arm 15 may then be slid to the left with its shaft 14 until it is in substantially the same relation to the anvil 37 that it had before, whereupon the light beam will cross the tap at a point about an inch from the entering end of the tap.

In order to fix the apparatus in adjusted position on the bed of the comparator so that the whole apparatus may be adjusted transversely of the beam of light, suitable clamping members 42 may be provided to slide in a transverse groove 43 formed in the bed. These clamp members 42 are drawn into clamping engagement with the bed as by suitable screws 44 which as shown may be reached through suitable perforations formed in the base 10.

For convenience in setting forth the relation of various parts of the device, the apparatus is described and claimed as supported in a horizontal position. It is obvious, however, that the apparatus may be mounted for use in any desired angular position.

Certain embodiments of our invention having thus been described, it should be evident to those skilled in the art that various changes and modifications may be made therein without departing from its spirit or scope as defined by the appended claims.

We claim:—

1. A device for holding a tap, comprising a pair of centering points adapted to engage the ends of a tap and to hold it in horizontal position, a supporting member positioned to engage the under side of the tap, and means carrying said centering means and permitting transverse movement thereof with a tap toward and from said supporting member.

2. A device of the class described, comprising a base, an arm hinged to said base on a horizontal axis, means on said arm for holding work horizontally to swing therewith between a loading position and an inspecting position, and a member mounted in said base in the path of swing of the work to engage work when swung thereagainst, and to define said inspecting position.

3. A device of the class described, comprising an adjustably fixed base, an arm hinged to said base, means carried by said arm for engaging the ends of the work and holding it in a predetermined position relative to the arm, and means mounted on said base to be engaged by the work and to cooperate with the arm to hold the work in a predetermined position relative to the base.

4. A device of the class described, comprising a horizontally disposed base having an aperture therein, a work-supporting anvil mounted in said aperture to turn on a vertical axis, a pair of bearings on said base, a shaft rockably journaled in said bearings, the ends of the shaft extending beyond the respective bearings, an arm having forwardly extending ears secured to said shaft adjacent the ends thereof to rock therewith, said ears being spaced to permit limited axial movement of the shaft with the arm, means carried by said arm for holding a tap by its ends to swing it into engagement with said anvil, said holding means comprising a pair of opposed centering points one of said points being adjustably fixed in said arm, the other point being resiliently yieldable away from the opposite point, and means for limiting the upward and forward swinging of said arm.

5. A device of the class described, comprising a base having bearings thereon, a shaft journaled in said bearings and capable of longitudinal movement therein, a swinging arm fixed to said shaft, means mounted on said arm for engaging and centering work in a predetermined position relative to said arm, and an anvil mounted in said base to be engaged by said work and to cooperate with the arm to hold the work in a predetermined position relative to the base, said base being provided with means for receiving and holding said anvil in a plurality of positions therein.

6. A device of the class described, comprising a base, a rock arm hinged to said base to be rocked between a loading position and a position for inspection of the work, means on said base and arm to limit the rocking motion in one direction and to support the arm in loading position, means carried by said arm for holding the work to swing with the arm and comprising a pair of opposed work-engaging members, one of said members being adjustably fixed to said arm, the other being resiliently mounted for yielding engagement with the work, and an anvil mounted in said base in the path of swing of the work, said anvil having a portion thereof shaped to enter between successive threads of the work to support the work in position for inspection.

7. A device of the class described, comprising a horizontally disposed base having a plurality of apertures therein arranged in a line, a work-supporting member receivable selectively in any of said apertures, an arm hinged to said base on a horizontal axis parallel to the line of apertures in the base, and means carried by said arm for holding the work horizontally to swing with said arm between a loading position and an inspecting position in contact with said work-supporting member, said arm being axially movable to positions corresponding to the location of said work-supporting member.

In testimony whereof we have affixed our signatures.

RALPH E. FLANDERS.
ROBERT O. BEARDSLEY.